(12) United States Patent
Comair

(10) Patent No.: US 8,317,617 B2
(45) Date of Patent: Nov. 27, 2012

(54) COMMUNICATION SYSTEM AND METHOD USING PICTORIAL CHARACTERS

(75) Inventor: Claude Comair, Bellevue, WA (US)

(73) Assignee: Nintendo, Co., Ltd., Kyoto (JP)

( * ) Notice: Subject to any disclaimer, the term of this patent is extended or adjusted under 35 U.S.C. 154(b) by 1623 days.

(21) Appl. No.: 11/244,165

(22) Filed: Oct. 6, 2005

(65) Prior Publication Data

US 2006/0040737 A1 Feb. 23, 2006

Related U.S. Application Data

(60) Division of application No. 10/118,314, filed on Apr. 9, 2002, now Pat. No. 7,052,396, which is a continuation-in-part of application No. 09/659,738, filed on Sep. 11, 2000, now Pat. No. 6,716,103.

(60) Provisional application No. 60/282,159, filed on Apr. 9, 2001.

(51) Int. Cl.
*A63F 9/24* (2006.01)
(52) U.S. Cl. ............................ 463/42; 709/204; 709/206
(58) Field of Classification Search ............... 463/40–42
See application file for complete search history.

(56) References Cited

U.S. PATENT DOCUMENTS

| | | | | |
|---|---|---|---|---|
| 5,083,271 | A | | 1/1992 | Thacher et al. ............... 364/411 |
| 5,558,339 | A | * | 9/1996 | Perlman .......................... 463/42 |
| 5,984,786 | A | | 11/1999 | Ehrman .......................... 463/42 |
| 6,106,399 | A | | 8/2000 | Baker et al. ..................... 463/42 |
| 6,112,177 | A | | 8/2000 | Cosatto et al. ................. 704/260 |
| 6,119,229 | A | | 9/2000 | Martinez et al. .............. 713/200 |
| 6,144,848 | A | | 11/2000 | Walsh et al. ................... 455/419 |
| 6,172,664 | B1 | | 1/2001 | Nakasuji et al. ............... 345/112 |
| 6,179,713 | B1 | | 1/2001 | James et al. ..................... 463/42 |
| 6,200,216 | B1 | | 3/2001 | Peppel ............................... 463/1 |
| 6,304,898 | B1 | * | 10/2001 | Shiigi ............................ 709/206 |
| 2001/0029455 | A1 | | 10/2001 | Chin et al. ..................... 704/277 |

OTHER PUBLICATIONS

"How PDAs work", printed from http://electronics.howstuffworks.com/pda.html, 14 pages.
"High-Tech Dictionary Emoticons", printed from http://computeruser.com/resources/dictionary/emoticon.html, 3 pages.
"The Ultimate Chatlist", printed from www.chatlist.com/faces.html, 20 pages.

* cited by examiner

*Primary Examiner* — Masud Ahmed
(74) *Attorney, Agent, or Firm* — Nixon & Vanderhye, P.C.

(57) ABSTRACT

Pictorial characters are used to replace one or more words or even one or more full sentences of a message for communication to one or more people. In the context of an electronic communication device, a person ("sending party") can use pictorial characters to "encode" words or sentences of a message to be sent to another person ("receiving party"). The receiving party, upon receiving the message, decodes the coded message and, if appropriate or desired, replies to the message. The communication devices used by the sending and receiving parties can be provided with various pictorial character-related features. For example, the communication devices may be provided with processing circuitry that conditions the use of a particular pictorial character for sending messages upon prior entry of a valid authorization (unlocking) code for that character. Alternatively or additionally, the processing circuitry of the communication devices may be responsive to received messages for proposing to the receiving party suggested meanings for one or more of the characters.

3 Claims, 8 Drawing Sheets

| | |
|---|---|
| 0-127 | ASCII BASIC CODE |
| 128-255 | ASCII EXTENDED CODE |
| 256-32767 | RESERVED |
| 32768-49151 | SYMBOLA CODES |
| 49152-65535 | USER PROGRAMED CODES |

Fig. 2

| SYMBOLA | ACTIVATION FLAG |
|---|---|
| SYMBOLA 1 | 0 |
| SYMBOLA 2 | 1 |
| SYMBOLA 3 | 1 |
| SYMBOLA 4 | 0 |
| SYMBOLA 5 | 0 |
| ⋮ | ⋮ |
| SYMBOLA n | 0 |

Fig. 4

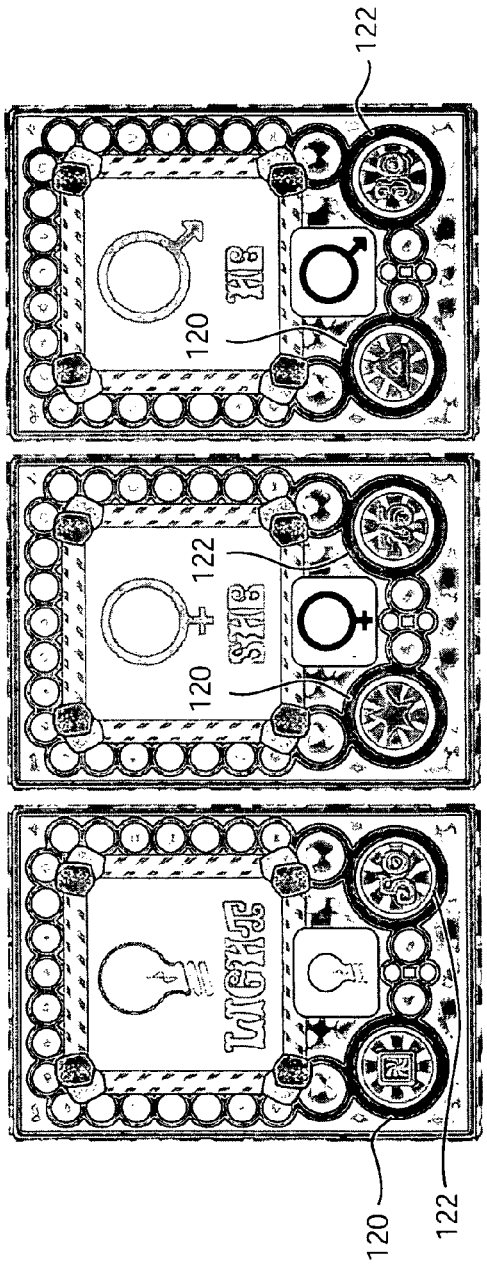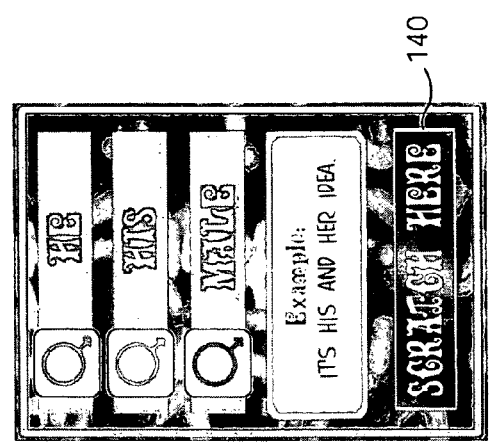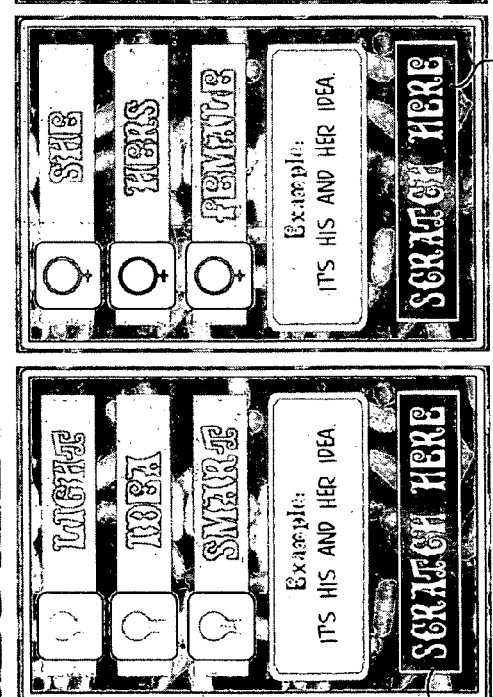

| SYMBOLA | HEADING |
|---|---|
| SYMBOLA 1 | HEAR, LISTEN |
| SYMBOLA 2 | LIGHT |
| SYMBOLA 3 | SHE |
| SYMBOLA 4 | HE |
| ⋮ | ⋮ |
| SYMBOLA n | EYE, LOOK |

Fig. 5

COMMUNICATION SYSTEM AND METHOD USING PICTORIAL CHARACTERS

PRIORITY

This application is a divisional of application Ser. No. 10/118,314, file Apr. 9, 2002, now U.S. Pat. No. 7,052,396, which claims priority from provisional Application No. 60/282,159, filed Apr. 9, 2001, and which is continuation-in-part of application Ser. No. 09/659,738, filed Sep. 11, 2000, now U.S. Pat. No. 6,716,103. The entire contents of the '159 and '738 applications are in incorporated herein.

FIELD OF THE INVENTION

This application describes systems and methods for communications between two or more people and, more particularly, this application describes systems and methods for encoding communications, or parts thereof, using pictorial characters.

BACKGROUND AND SUMMARY OF THE INVENTION

Human beings communicate in a variety of different ways and various communication devices have been developed to permit and facilitate such communications. The popularity of e-mail, instant messaging, pagers and mobile telephones demonstrates the appetite of the public for systems that permit people to communicate with each other regardless of where people are or the activities in which they are engaged. The systems and methods described in this application may be used to provide enhancements to existing communications systems and/or to facilitate communications using devices such as game machines that traditionally have had only limited use as communication devices. For example, as more sophisticated game machines (both hand-held and consoles) provide connections to the Internet, to mobile telephones, to pagers, and the like, it would be desirable to provide systems and methods that enable and/or enhance communications with other people including other users of game machines.

This application describes the use of a library of pictorial characters ("symbola") that can be used to replace one or more words or even one or more full sentences of a message for communication to one or more people. In the context of an electronic communication device, a person ("sending party") can use symbola to "encode" words or sentences of a message to be sent to another person ("receiving party"). The receiving party, upon receiving the message, decodes the coded message and, if appropriate or desired, replies to the message. The communication devices used by the sending and receiving parties can be provided with various symbola-related features. For example, the communication devices may be provided with processing circuitry that conditions the use of a particular symbola character for sending messages upon prior entry of a valid authorization (unlocking) code for that character. Alternatively or additionally, the processing circuitry of the communication devices may be responsive to received messages for proposing to the receiving party suggested meanings for one or more of the symbola characters.

These and many other features and advantages will be better and more completely understood by referring to the following detailed description of example embodiments in conjunction with the drawings.

BRIEF DESCRIPTION OF THE DRAWINGS

FIG. 2 illustrates the organization of characters for the communication device.

FIGS. 3A-3L show examples of symbola on cards that may be distributed or sold (e.g., at retail outlets) to those wishing to communicate using symbola.

FIG. 4 shows a data structure that may be used to track which symbola are usable to compose messages.

FIG. 5 shows a data structure that may be used to generate suggested textual equivalents for one or more symbola.

DETAILED DESCRIPTION

Figure 1:
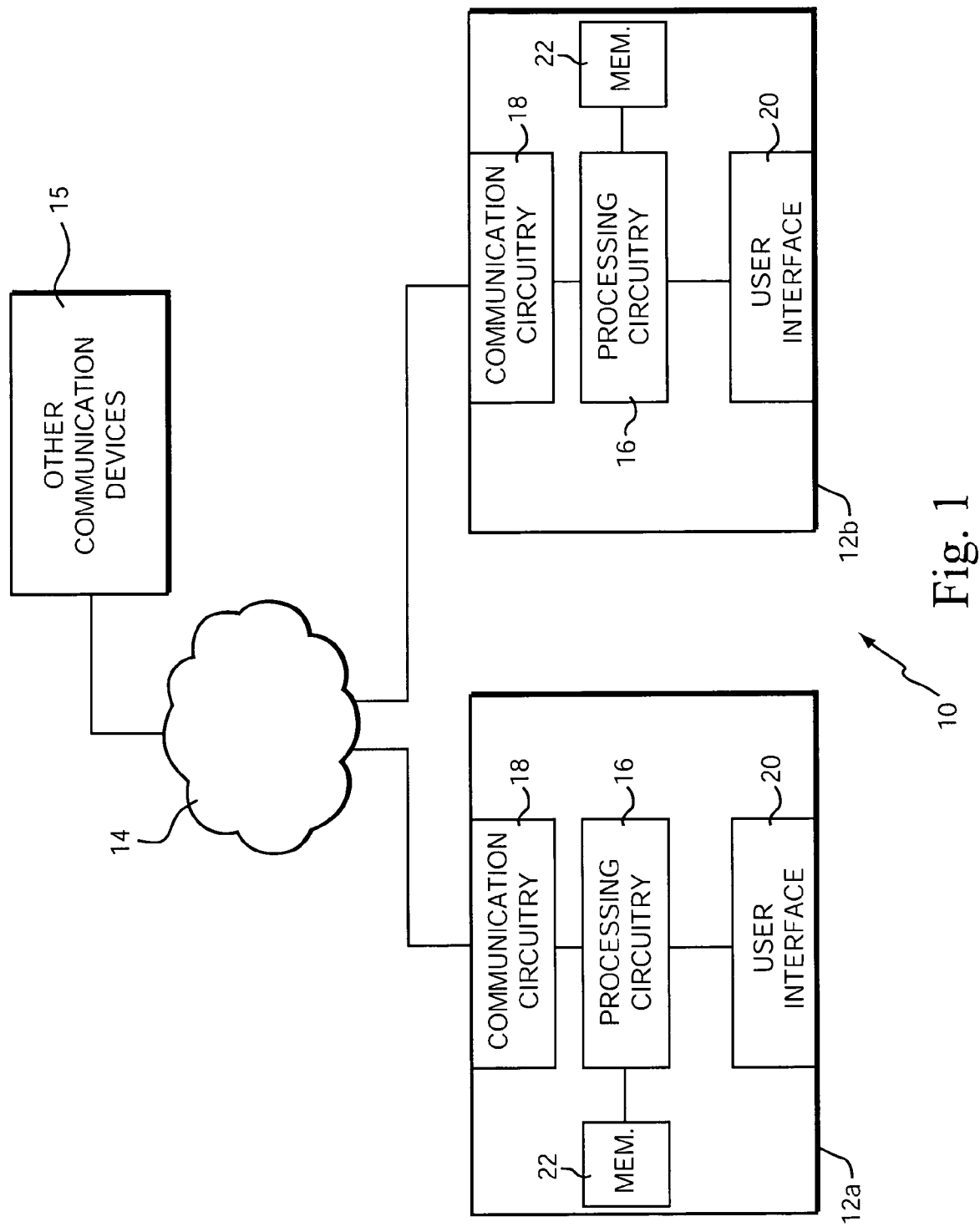
FIG. 1 is a generalized block diagram of a communications system in which symbola characters may be used.

FIG. 1 is a generalized block diagram of a communications system 10 in which symbola characters may be used. Communications system 10 includes communication devices 12a, 12b that communicate with each other over a communication network 14 (such as the Internet). Generally speaking, communication network 14 may be any conventional wired or wireless communication network (or contain a combination of wired and wireless elements) and communication devices 12a, 12b may be any devices suitably configured for communication over communication network 14. FIG. 1 shows other communication device(s) 15 such as web server computers that may be connected to communication network 14. In addition to communicating with each other, communication devices 12a, 12b may communicate with these other communication device(s) 15. Communication devices 12a, 12b each includes processing circuitry 16 for controlling its overall operation and communication circuitry 18 for communication over communication network 14. Processing circuitry 16 may comprise one or more of a microprocessor, an application specific integrated circuit (ASIC), a programmable logic array, a graphics processor, a sound processor, and the like. Communication circuitry 18 may be a modem, a pager, network interface circuitry and the like. Although communication circuitry 18 is shown in FIG. 1 as being internal communication circuitry, it will be appreciated that communication circuitry 18 may be external communication circuitry connected to processing circuitry 16 via an appropriate port such as a serial port.

Communication devices 12a, 12b may be devices whose primary (or only) functionality is as a communication device (e.g., a mobile telephone, a portable telephone, a pager, etc.) or devices for which communication is a secondary functionality. As one example of this second type of device, communication devices 12a, 12b may be game machines (hand-held or console) equipped with modems for communications over the Internet. As another example, communication devices 12a, 12b may be game machines equipped with pagers for wireless communication over a paging network. As still another example, communication devices 12a, 12b may be game machines that are connected directly or via a suitable adapter to mobile telephones for wireless communication over a mobile telephone network. As still yet another example, communication devices 12a, 12b may be game machines connected to each other by a link cable.

Communication devices 12a, 12b are each provided with a user interface 20 that, among other things, permits users to compose and read messages. For example, user interface 20 may comprise a keypad and a display device. Other conventional output devices such as a speaker, headphone jack, and the like may also be provided as part of the user interface. A user may compose messages using the keypad as an input device and the display device to review the input. Similarly, a user may use the display device to display received messages and the keypad as an input device for selecting which messages to display, delete, save, etc. Other conventional input devices such as a microphone, a mouse, a trackball and the like may be provided as part of the user interface. A memory 22 stores programs (such as the operating system) and data used in the operation of the communication device. Memory 22 may be a combination of read-only memory and read/write memory.

As will be described in greater detail below, symbola provides a library of pictorial characters that can be used to replace one or more words or even one or more full sentences of a message composed using communication devices 12a, 12b. Thus, a person ("sending party") can use symbola to "encode" words or sentences of a message to be sent to another person ("receiving party"). The receiving party, upon receiving the message, decodes the coded message and, if appropriate or desired, replies to the message. Coded messages using symbola can reduce the cost of communication, increase the element of fun in using a communication device, and create a world-wide community of users.

Memory 22 of communication devices 12a, 12b may store one or more standard libraries of words, phrases, sound bytes and graphic elements (e.g., hearts, spades, a boat) to compose messages. These standard libraries are supplemented by a custom library of symbola to add to the speed, ease and fun of messaging by introducing images and emotions into "conversations". The symbola characters may be used to develop a "language" and to create a "grammar" for that language. The language and/or grammar may be unique to two users or to some small group of users and permits communication of messages that will only be understood by the users with knowledge of the language and grammar. The collection of all the codes and the rules that bind them together into a simple language constitutes the "symbola language".

In the example system, symbola is implemented in a 2 byte-coded character environment. Of course, a different number of bits or bytes may be used to designate a character depending on, for example, the nature of the communication device. In a 2 byte-character coded environment, up to 65536 coded characters or symbols ranging from 0 to 65536 can be accessed. FIG. 2 shows that the codes may be organized as 0 to 127—ASCII basic set; 128 to 255—ASCII extended set; 256 to 32767—reserved; 32768 to 49151—symbola code area; and 49152 to 65535—user programmable code area. Of course, this organization is provided by way of example, not limitation. For example, the code organization shown in FIG. 2 may be modified, for example, in view of other character systems (e.g., JIS code for representing Kanji characters) used in a particular communication device. A symbola is communicated by transmitting the code for that character to the receiving party. The communication device of the receiving party uses the received code to access its memory to retrieve the appropriate symbola for display on the display of its user interface.

The operating system of the communication device (i.e., the set of basic programs and utilities that make the communication device) preferably allows copying, pasting, editing and concatenating between the symbola code area and the user programmable code area. These operations facilitate the creation of new pictorial characters that are based on already existing ones. These operations also allow concatenation of several pictorials into a single code. Among other things, this reduces the cost of transmitting messages in communication systems (such as paging systems) in which charges for messages are incurred on a per character basis. It also enhances the fun and entertainment value by permitting such combinations to be formed. The newly configured symbola can then be shared with others via communication network 14.

It is also possible to transmit graphic image files for particular symbola to the receiving party. In this case, the communication device of the receiving party should be configured to execute appropriate graphics viewing software so that the symbola corresponding to the received graphic image files are displayed on the display of its user interface.

The teaching of the symbola language is preferably carried out using cards such as those shown in FIGS. 3A-3L. In this way, the language is presented to users gradually and the users have an incentive to collect the cards. Users learn the language a few words at a time and the learning of the language is less overwhelming. Pictorial characters and instructions about the characters and their common usages are printed on the fronts and/or backs of the cards. The cards may be grouped into sets having certain themes (e.g., an Egyptian set, a futuristic set and the like). This makes the cards more attractive and enhances their collectibility. It is also possible to make some sets more or less common than others.

Figure 3C:
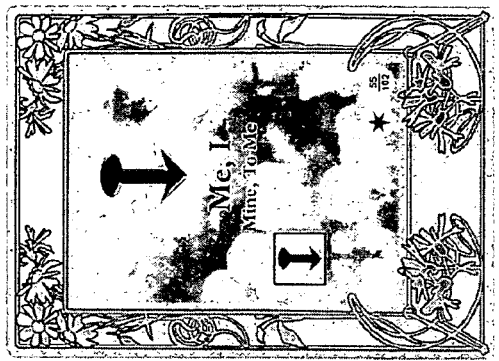
Figure 3B:
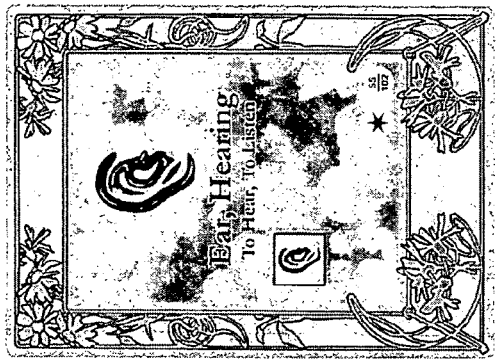
Figure 3A:
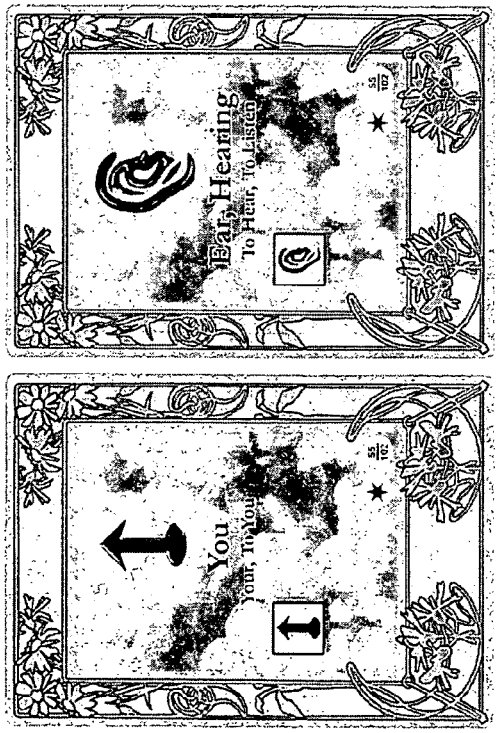

FIGS. 3A-3L show examples of symbola on cards that may be distributed or sold (e.g., at retail outlets) to those wishing to communicate using symbola. It is also possible to generate "on-line" cards that may be downloaded from a symbola web-site (or e-mailed to a user) and printed out using a user's personal computer. To enhance collectability or desirability, the cards may be provided with themes (e.g., Western, Asian, Ancient Egypt, etc.) or other graphics. The card of FIG. 3A shows an upwardly directed arrow that means "You"; the card of FIG. 3B shows an ear that means "Ear or "Hearing"; and the card of FIG. 3C shows a downwardly directed arrow that means "Me" or "I". The cards can be viewed as constituting part of a symbola dictionary and may be used in card games such as hangman and guess the coded message.

As in certain languages, symbola may use certain accents or modifiers over or beside the pictorials. Usually, a pictorial represents an object or a noun. By placing an accent over or beside certain symbols, the user conveys an action (or verb) associated with the noun. A "sounds-like" modifier deprives all meaning from the noun or verb and the pictorial must just be sounds. Color modifiers may also be used.

Figure 3F:
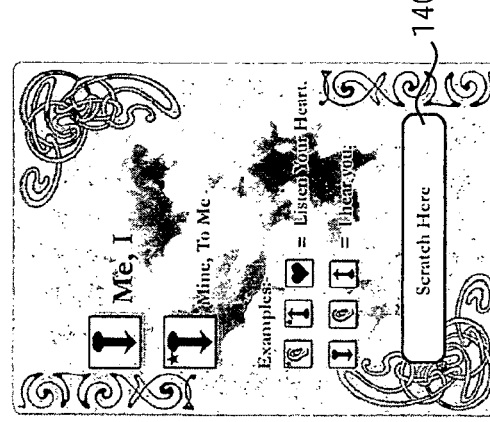
Figure 3F:
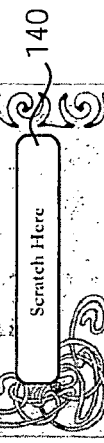
Figure 3E:
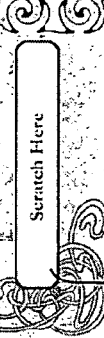
Figure 3D:
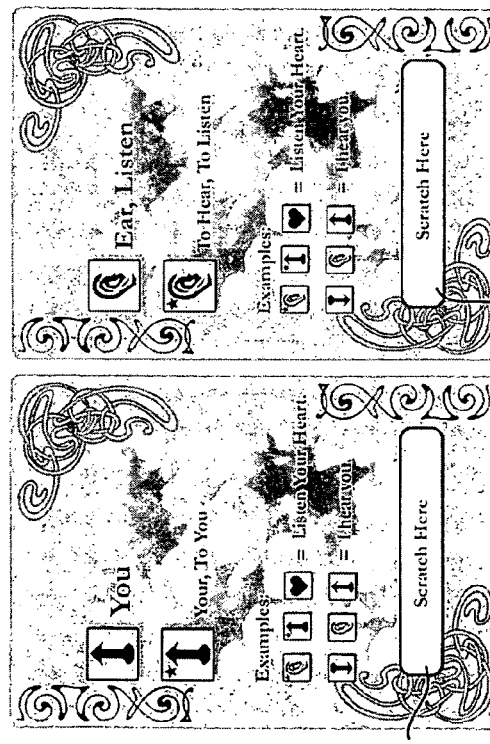

More specifically, certain accents or modifiers may be added to each of the symbola to change or vary its meaning. For example, these added symbols may make the symbola an adjective or may make the symbola indicative of a feeling, an action and the like. Examples of such added symbols are shown in FIGS. 3D-3F. With reference to FIG. 3D, positioning a star (*) at the upper left corner of the upwardly directed arrow changes the meaning of "You" to "Your" or "To You". With reference to FIG. 3E, positioning a star (*) at the upper left corner of the ear changes the meaning of "Ear" or "Listen" to "To Hear" or "To Listen". With reference to FIG. 3F, positioning a star (*) at the upper left corner of the downwardly directed arrow changes the meaning of "Me" or "I" to "Mine" or "To Me". Each of the cards shown in FIGS. 3D-3F provides examples of messages that include one or more of the symbols shown on the cards. For the example cards shown in FIGS. 3D-3F, the messages are "Listen (to) Your Heart" and "I hear you". It will be apparent that other symbols may be positioned around the symbola to change or vary the meaning of the symbola. For example, a question mark (?) positioned at the upper right corner of the symbola may indicate "sounds like".

The meaning of a symbola may also be determined by its color. FIGS. 3G-3I show cards that illustrate symbola for the words "light", "she" and "he", respectively. FIGS. 3J-3L show cards that illustrate how the meaning of the symbola for "light", "she" and "he" can be changed by changing the color of the symbola. Thus, with reference to FIG. 3J, the symbola in the card of FIG. 3J means "light", "idea" or "smart" if the color of the symbola is yellow, light blue or red, respectively. With reference to FIG. 3K, the symbola in the card of FIG. 3K means "she", "hers" or "female" if the color of the symbola is pink, dark blue or red, respectively. With reference to FIG. 3L, the symbola in the card of FIG. 3L means "he", "his" or "male" if the color of the symbola is pink, gold or purple, respectively.

Each symbola may, if desired, have an associated rarity code and one or more game scoring values. The rarity code (which may be numeric or symbolic) is indicative of how rare the symbola is in a certain set. The game scoring values can be used in a variety of word games that can be played with the card sets themselves without the use of the communication device. It is preferable (although not required) that the rarity code is the same for a specific symbola across the different sets; whereas the game scoring value would vary from set to set for the same symbola. Typically, the more rare the set is, the higher the game scoring value is. The cards of FIGS. 3G-3I contain symbolic rarity codes 120 and numeric scoring codes 122.

The variance in the scoring system encourages users to collect the same symbola from different sets. The variance also enhances game play. For example, using symbola of the same set in order to compose a coded message would be less valuable than coding it from different sets.

Card binders may also be purchased by users. The cards and the binder become the dictionary of the language. Board games may also be purchased in order to play the various card games.

The display device of user interface 20 displays a software keyboard from which characters for composing messages are selected. One or more "positioning" keys of the keypad of user interface 20 may be used, for example, to position a cursor highlight on a character (e.g., a letter, a number or a symbola) of the software keyboard and a "select" key may be used to select the highlighted character. The displayed keyboard may be a combined keyboard that permits selection from among letters, numbers and symbola or separate keyboards for letters, numbers and symbola may be provided. If separate keyboards are provided, each keyboard may be provided with a "short-cut" key to the other keyboards to ease the process of composing messages that include a variety of types of characters. If the display screen is touch-sensitive, a stylus may be used to select characters from the keyboard(s). In still other implementations, user interface 20 of the communication devices may comprise character-recognition software for recognizing characters of a certain character set that are written on a writing area of a touch-sensitive display using a stylus. If the communication device is a game machine for displaying images on a television, the user interface may comprise a controller such as the controller shown in U.S. Pat. No. 6,102,803, the contents of which are incorporated herein. Using the switches and buttons on the controller, a user may position a cursor highlight on a character displayed on the television and then select the highlighted character.

User interface 20 is not limited to composing messages on a character-by-character basis. The user interface may provide for the selection of certain common words or phrases (e.g., Hello, Good-Bye, Thanks, See you later!, etc.) to reduce the time needed to compose messages. The interface may also be of the type that provides assistance or help as the user composes messages. For example, if the user enters the characters "HEL", the display may display "HELLO" and suggest that the user may appropriately position the cursor highlight to select this word. The interface may also be configured to suggest a particular symbola character as the user composes a message. Thus, for example, if the user enter the word "LIGHT", the display may display the symbola for "LIGHT" shown in FIG. 3G and suggest that the user may appropriately position the cursor highlight to select the symbola for "LIGHT" for use in the composed message. The relationship between entered words and symbola for providing such suggestions may be based on the data structure mentioned below in connection with FIG. 5.

Use of some or all of the symbola stored in memory 22 may be conditioned upon the entry of a particular activation (unlocking) code for that symbola. More specifically, processing circuitry 16 may condition the use of a symbola for composing messages upon prior entry of a valid activation code for that symbola. The activation codes for particular symbola may, for example, be provided on scratch-away portions 140 of the cards shown in FIGS. 3D-3F and 3J-3L. The activation code may, for example, be an alphanumeric code that is entered via user interface 20. Processing circuitry 16 may track which symbola are usable for composing messages using a data structure like that shown in FIG. 4. As shown in FIG. 4, memory 22 may store activation flags respectively associated with each symbola. Entry of an appropriate activation code for a symbola sets the corresponding activation flag to indicate that the symbola is usable to compose messages. Those symbola whose activation flags are cleared cannot be used to compose messages.

Of course, other methods for obtaining activation codes may be used. For example, activation codes could be obtained from a web site maintained by an activation code provider. By accessing the web site and entering appropriate information such as password, identification, and/or payment information, a user may obtain symbola activation codes which are downloaded to the communication device for display on the display of the user interface. The user may then input the downloaded codes using the software keyboards. Alternatively, the downloaded activated codes may be used by processing circuitry 16 to automatically activate the corresponding symbola without any further input from the user. Activation codes may also be generated during game play on a game machine. For example, achieving certain levels or reaching certain goals may generate a code that the user can save (e.g., in memory 22 or by writing down) for later use in activating symbola. This approach can foster a sense of community among those that play the same game who are then able to communicate with each other using symbola developed for and understood by users of that particular game. If desired, the codes generated during game play can be used to automatically activate the corresponding symbola without requiring the user to key-in the characters of the code.

It is possible to provide a single activation code that activates a group of symbola (which may or may not be related to each other).

Symbola can also be generated during game play and the game-play-generated symbola can be stored in the symbola library in memory 22. In other cases, symbola identifiers may be generated during game play. These identifiers may be used, for example, when the communication device is connected to a symbola provider web site, to download from the web site to the symbola library in memory 22 the symbola corresponding to the generated identifiers.

It is desirable (although not necessary) that the above-described symbola locking mechanism only prevent the use of the locked (or unactivated) symbola for composing outgoing messages because incoming messages may contain symbola that have not been unlocked and it is desirable to display the complete messages composed and forwarded by others. Thus, it is possible that a particular user may be unable to use some symbola to compose messages, but will be able to see these same symbola if they are included in incoming messages. The operating system of the communication device may be configured to provide one display screen (or set of screens) showing the symbola usable for composing messages and another display screen (or set of screens) showing the symbola that are displayable for incoming messages.

In another implementation, processing circuitry 16 could be configured so that entry of a first valid activation code is required to enable use of a symbola for composing messages and entry of a second (different) valid activation code is required to enable the use of modifiers for varying or changing the meaning of the symbola. Processing circuitry 16 may track which symbola are usable with modifiers by using the data structure of FIG. 4 with an additional activation flag.

A communication device may be sold to users with none, some, or all symbola in the symbola library stored in memory 22 activated. As one example, a communication device may be sold to users with a certain "core" symbola already activated, with the use of additional "premium" symbola requiring entry of activation codes as described above. Additional symbola may be added to the symbola library in memory 22 after the sale of the communication device 12 to a user. For example, a web site maintained by a symbola provider may permit a user to connect his/her communication device to the web site over communication network 14 to download symbola for addition into the symbola library stored in memory 22. The activation flags of the downloaded symbola may already be set or activation of the downloaded symbola may still be conditioned upon the use of a valid activation code. In the former case, the symbola provider and the activation code provider may be the same entity, while in the latter case the symbola provider and the activation code provider may be different entities.

To enhance system security, the activation code entered by the user may constitute only the initial step of an activation process. For example, the activation code entered by the user may constitute a first activation code part that initiates communication over communication network 14 to a central symbola server that, in response to the communication, transmits a message (or messages) to the communication device that contains second activation code parts for actually activating certain symbola already stored in memory 22 to enable their use in composing messages.

The communication device to which the coded message is sent could include a program that attempts to decipher the message and give suggested "interpretations" (e.g., textual equivalents). More specifically, processing circuitry 16 may be responsive to messages received via the communication circuitry for generating suggested textual equivalents for one or more symbola. Memory 22 may use a data structure like that shown in FIG. 5 to implement this feature. The data structure creates an association between symbola and one or more of the meanings associated with that symbola. The data structure may, if desired, include entries that associate a modified symbola with a meaning.

A portable game system and a game console system are described below as two examples of such communication devices. However, it will be apparent that the invention is not limited in this respect and symbola may be readily applied to any of a variety of wired and wireless communication devices including personal digital assistants, telephones, and the like.

Figure 6A:
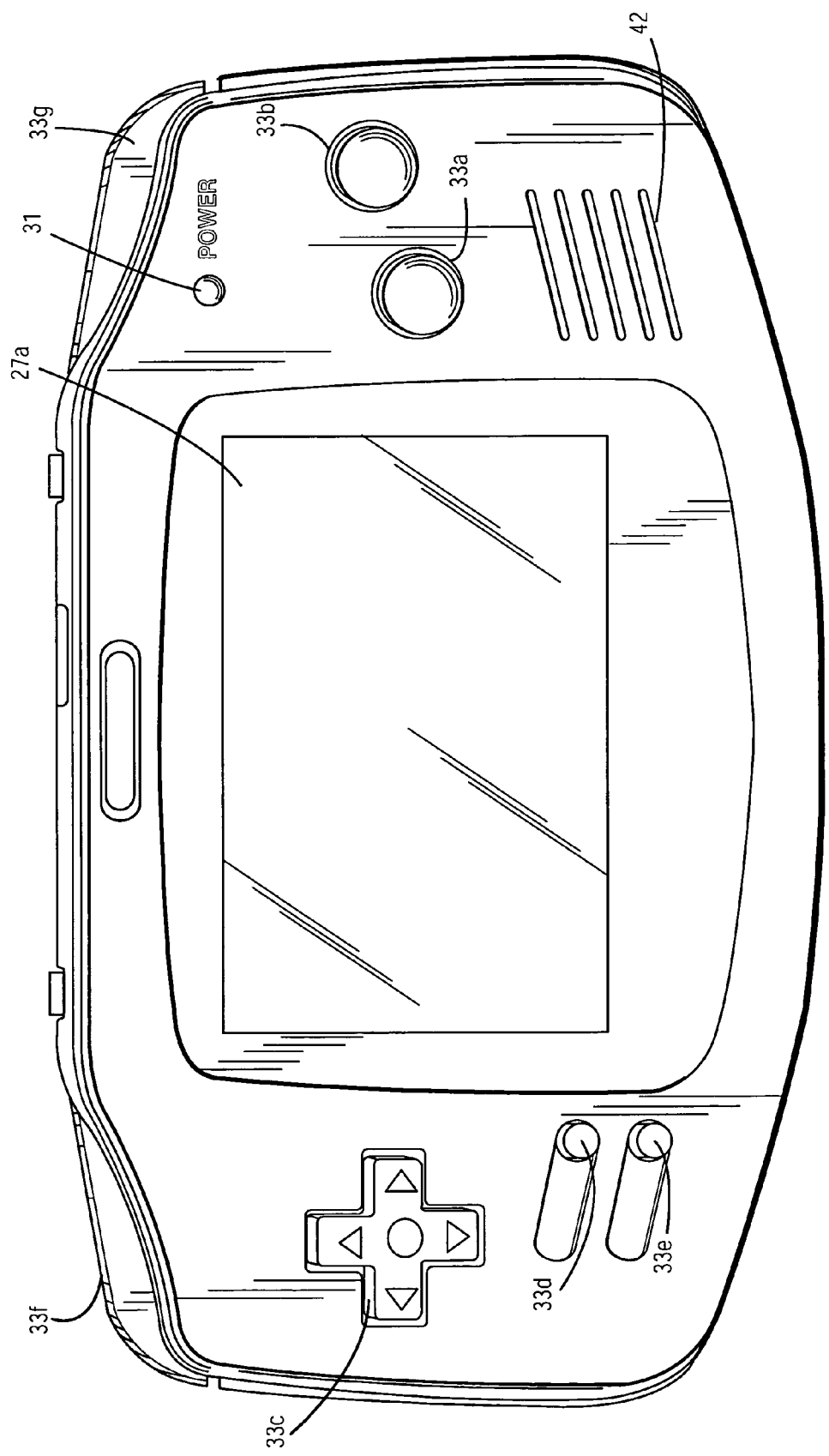
FIGS. 6A and 6B are a front perspective view and a top-down view, respectively, of an example portable game system.
Figure 6B:
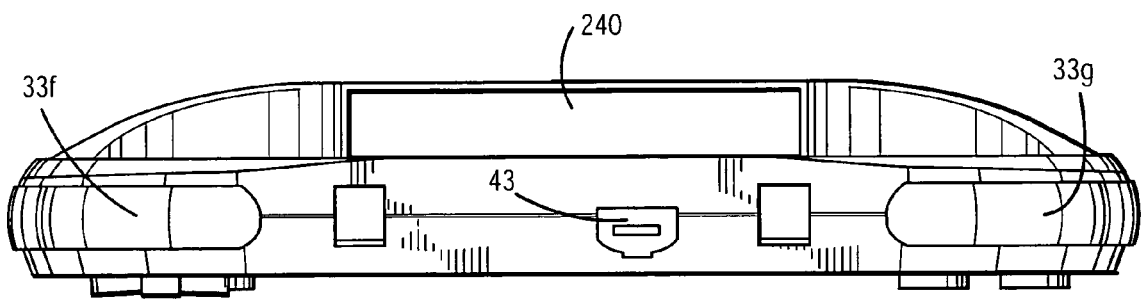

FIGS. 6A and 6B are a front perspective view and a top-down view, respectively, of an example portable game system AGB. The AGB can be used to play interactive video games with accompanying sound. It can also be used for a variety of other applications including, but not limited to, an address book, a calculator, a date book, and e-mail and other communication applications. Video is displayed on display 27a and the sound is output through speaker 42. Display 27a may, for example, be a reflection (non-backlit) TFT color LCD. Display 27a may also, if desired, be implemented as a touch-sensitive screen. The volume is adjustable by a volume control 35 and headphones (not shown) may be connected to the AGB via a headphone jack 37. An interface 43 is used for interfacing with, for example, other portable game systems; console game systems connected to televisions or other display devices; external devices such as infrared communication circuits, modems, adapters, bar code readers, wireless telephones, pagers and the like.

The AGB is powered by batteries (not shown) contained in a battery compartment. Power indicator 31 dims as the batteries lose power to provide a visual indication that new batteries are needed. In an alternative implementation, the AGB may also be configured for connection to an AC adapter to permit play without batteries.

To play a video game (or use some other application), the user selects an appropriate storage medium storing the video game (or application) he or she wants to play (or use), and inserts that storage medium into a slot 240 in the AGB. The storage medium may, for example, be in the form of a cartridge housing a memory that stores the game program or application. Such memory is typically semiconductor memory, although optical and magnetic memories are also usable. The user operates a power switch to turn on the AGB and cause the AGB to begin running the video game or application based on the program stored in the storage medium. Of course, it is also possible to provide some games and/or applications in on-board memory of the AGB. Such games and applications may be accessible without inserting a storage medium into slot 240.

Operating keys 33a-33g are used to provide inputs to the AGB. Operating keys 33a and 33b are used, for example, to cause various motions and actions of the game characters displayed on LCD 27a. These motions and actions include a weapon use, a jump and the like. Operating key 33c is used to move a game character displayed on LCD 27a in four directions, e.g. upward, downward, right and left. Operating key 33d is a select key that is used, for example, for game mode selection and the like. Operating key 33e is a start key that is used to start playing a game or to temporarily stop the progress of a game. The AGB is also provided with left and right shoulder buttons 33f and 33g for supplying operating signals. When a player holds the AGB during use, operating keys 33a and 33b are accessible by the thumb of the right hand, operating key 33c is accessible by the thumb of the left hand, left shoulder button 33f is accessible by the index finger of the left hand and right should button 33g is accessible by the index finger of the right hand. In this way, a user may supply a variety of inputs to the AGB. Depending upon the particular game or application, the various operating keys 33a-33g can perform different functions at different times.

Various input devices may also be connected to the AGB via interface 43 or cartridge slot 240. For example, an infrared communication device may be connected to interface 43 to permit communication with other similarly equipped devices. A modem or network interface may be connected to the AGB via interface 43 or via cartridge slot 240 to permit connection to the Internet. A pager may be connected to the AGB via interface 43 or via cartridge slot 240 to permit paging messages to be transmitted and received. A digital camera may be connected to the AGB via cartridge slot 240 to input captured images.

Additional details of the AGB may be found in application Ser. No. 09/627,440, filed on Jul. 28, 2000, the contents of which are incorporated herein.

Figure 7:
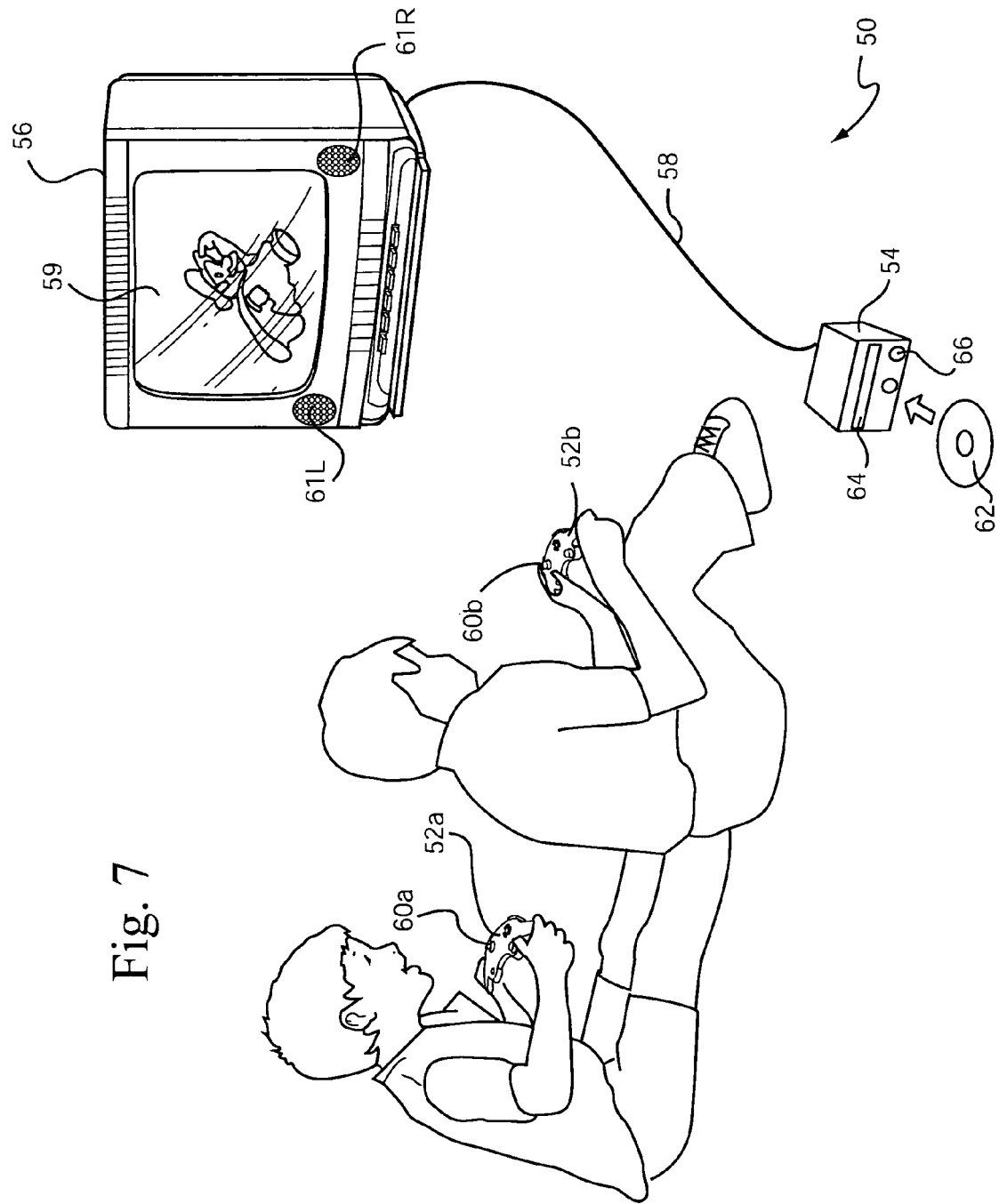
FIG. 7 shows an example console game system.

FIG. 7 shows an example interactive 3D computer graphics system 50. System 50 can be used to play interactive 3D video games with interesting stereo sound. It can also be used for a variety of other applications. In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52*a*, 52*b* or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52*a*, 52*b* to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Additional details of game system 50 may be found in application Ser. No. 09/722,367, filed on Nov. 28, 2000, the contents of which are incorporated herein in their entirety.

While the invention has been described in detail, the foregoing description is in all aspects illustrative and not restrictive. It is understood that numerous other modifications and variations can be devised without departing from the scope of the invention.

I claim:

1. A hand-held display device for playing a video game comprising:
    a housing grippable by a user's hands;
    a liquid crystal display viewable by the user gripping the housing;
    input devices operable by the user when the user grips the housing;
    a connector for operatively connecting to a computer-readable medium having stored thereon a video game program for the video game;
    communication circuitry;
    a memory;
    processing circuitry which executes the video game program,
    wherein the execution of the video game program generates identifiers of pictorial characters and said processing circuitry uses the identifiers to access a remotely located database of pictorial characters via the communication circuit to retrieve from the remotely located database for storage in the memory pictorial characters corresponding to the identifiers.

2. The hand-held display device according to claim 1, wherein the communication circuitry comprises a modem.

3. A hand-held communication device, comprising:
    a memory;
    an operating system for enabling user-generated pictorial characters to be stored in the memory;
    a user-interface comprising a touch-sensitive screen for enabling the user to compose a message comprising one or more selected ones of the user-generated pictorial characters stored in the memory, the pictorial characters being selected by touching images of the pictorial characters displayed on the touch-sensitive screen; and
    wireless communication circuitry for communicating the message over a wireless communication network.

* * * * *